No. 675,911. Patented June 11, 1901.
M. A. TIPNEY.
PORTABLE OVEN.
(Application filed Aug. 25, 1900.)
(No Model.)
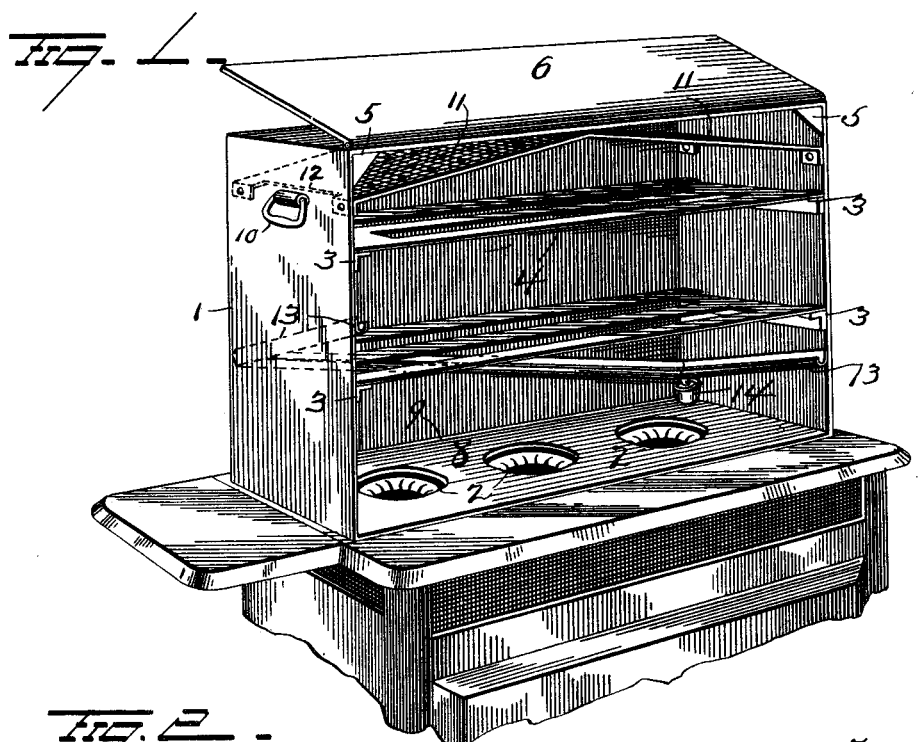
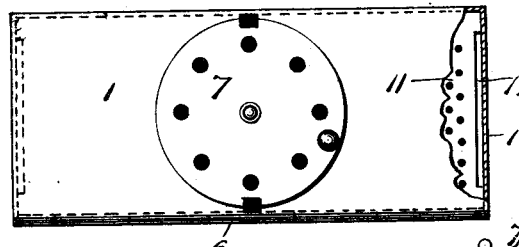
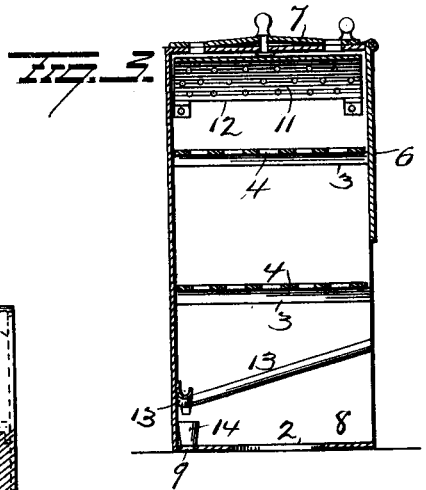
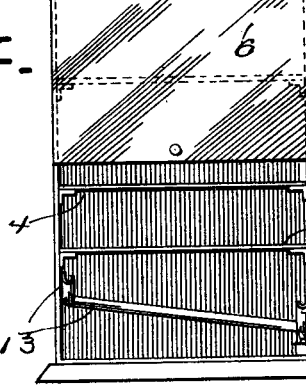
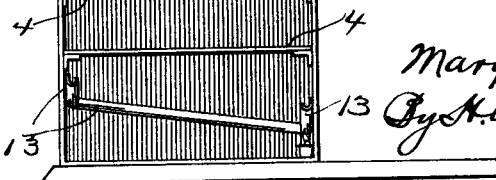
WITNESSES
INVENTOR
Mary A. Tipney
By H. A. Seymour
Attorney

UNITED STATES PATENT OFFICE.

MARY A. TIPNEY, OF JANESVILLE, WISCONSIN.

PORTABLE OVEN.

SPECIFICATION forming part of Letters Patent No. 675,911, dated June 11, 1901.

Application filed August 25, 1900. Serial No. 28,038. (No model.)

*To all whom it may concern:*

Be it known that I, MARY A. TIPNEY, a resident of Janesville, in the county of Rock and State of Wisconsin, have invented certain new and useful Improvements in Portable Ovens; and I do hereby declare the following to be a full, clear, and exact description of the invention, such as will enable others skilled in the art to which it appertains to make and use the same.

My invention relates to an improvement in portable ovens, the object of the invention being to provide an oven which will be especially adapted for keeping food or dishes warm, but which will also be adapted for cooking purposes.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a top view of the same. Fig. 3 is a view in transverse section, and Fig. 4 is a front view of a modified form of my invention.

My improved oven comprises a rectangular casing 1, open at its front and provided in its bottom 8 with openings 2, arranged side by side to fit over the burners of a stove, and the bottom 8 made at its extreme inner edge with a longitudinal slot or opening 9 to permit the heat from the stove independent of that of the burners to enter the casing 1 through said slot or opening 9 and assist in keeping the food and dishes warm. Angle-brackets or supporting-beads 3 are secured to the inner face of the casing 1, on diametrically opposite sides thereof, to form supports for removable open-work shelves 4, on which the dishes are supported, and the upper corners of the casing are braced by triangular brackets 5, as shown.

To the top of the casing 1, at its forward edge, is hinged a door or shutter 6 of a size sufficient to close the upper portion of the oven, but leaving an open space at the bottom for the admission of heated air, and the top of the casing is provided with a suitable ventilator 7 to regulate the passage of heated air therethrough.

By the construction and arrangement of parts above described the hot air can be trapped in the upper portion of the casing by lowering the shutter 6 and closing the ventilator 7, or the draft of air can be made to pass through the upper portion of the casing by opening the ventilator more or less. If a less degree of heat is desired in the upper portion of the casing, this may be accomplished by raising the shutter 6 to the position shown in Fig. 1, and, if desired, the shutter may be propped by any suitable means in a partially-raised position, when it will act as a deflector to direct and evenly distribute a current of air through the casing.

Handles 10 are secured to the sides of the oven to facilitate moving the same.

Inclined perforated partitions 11 are secured in the top of the casing 1 to permit the passage of steam therethrough and guide the condensed steam to the sides of the casing, where the partitions are recessed, as shown at 12, to empty the condensed steam against the sides of the casing. A trough 13 is secured to the inner face of the sides and back of the casing and adapted to catch the condensed steam and convey it to a cup or receptacle 14, provided for the purpose.

It will be seen that with my improved oven food can be cooked directly on the burners of the stove and at the same time be partially inclosed in the oven, and after the food is cooked sufficiently it can be placed on one of the shelves and kept warm while other food is being cooked on the burners, and that water can be placed in a suitable receptacle on the burners, so as to generate steam and cook or warm the food by steam.

Instead of constructing the oven as above described I might make the same as shown in Fig. 4. In this form of my invention the openings in the bottom of the oven to expose the burners of the stove are arranged one behind the other, hence necessitating the construction of the casing of greater depth than its width, so as to occupy but the minimum space on the stove.

Various other slight changes might be resorted to in the general form and arrangement of the several parts described without departing from my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. A removable attachment for stoves, comprising a casing having an open front and a shutter hinged to and suspended from the upper edge of the casing and terminating a considerable distance from the bottom of said open front, whereby a trap of adjustable capacity for hot air is formed in the upper part of the casing and a space is left below said shutter for the ingress of air and to give access to the burners.

2. A removable attachment for stoves, comprising a casing having an open front and a shutter hinged to and suspended from the upper edge of the casing and terminating a considerable distance from the bottom of said open front, whereby a trap of adjustable capacity for hot air is formed in the upper part of the casing and a space is left below said shutter for the ingress of air and to give access to the burners, and a damper in the top of the casing.

3. The combination in a warming-oven, of a casing adapted to be seated upon a stove, inclined perforated partitions disposed in the upper portion of the oven and recessed at their outer ends to permit the discharge of moisture onto the inner faces of the end walls of the casing, an inclined trough secured to each end wall of the casing, and an inclined trough secured to the rear wall of the casing and connecting the lower ends of the first-mentioned troughs.

In testimony whereof I have signed this specification in the presence of two subscribing witnesses.

MARY A. TIPNEY.

Witnesses:
A. C. THORPE,
F. C. GRANT.